(12) United States Patent
Rajamony et al.

(10) Patent No.: US 7,287,122 B2
(45) Date of Patent: Oct. 23, 2007

(54) DATA REPLICATION IN MULTIPROCESSOR NUCA SYSTEMS TO REDUCE HORIZONTAL CACHE THRASHING

(75) Inventors: Ramakrishnan Rajamony, Austin, TX (US); Xiaowei Shen, Hopewell Junction, NY (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/960,611

(22) Filed: Oct. 7, 2004

(65) Prior Publication Data

US 2006/0080506 A1    Apr. 13, 2006

(51) Int. Cl.
*G06F 15/163* (2006.01)
*G06F 13/36* (2006.01)

(52) U.S. Cl. .................. 711/120; 711/118; 711/119; 711/124; 711/129; 711/148

(58) Field of Classification Search ............... 711/119, 711/118, 120, 124, 147, 148
See application file for complete search history.

(56) References Cited

U.S. PATENT DOCUMENTS

| | | | |
|---|---|---|---|
| 5,274,789 A * | 12/1993 | Costa et al. ............... 711/206 |
| 5,303,362 A * | 4/1994 | Butts et al. ............... 711/121 |
| 5,727,150 A * | 3/1998 | Laudon et al. ............ 709/215 |
| 6,347,362 B1 * | 2/2002 | Schoinas et al. .......... 711/147 |
| 6,453,408 B1 * | 9/2002 | Stuart Fiske et al. ....... 712/29 |
| 6,766,424 B1 * | 7/2004 | Wilson ..................... 711/148 |
| 6,839,739 B2 * | 1/2005 | Wilson ..................... 709/213 |
| 6,871,219 B2 * | 3/2005 | Noordergraaf et al. .... 709/214 |
| 6,961,821 B2 * | 11/2005 | Robinson .................. 711/133 |

* cited by examiner

*Primary Examiner*—Gary Portka
*Assistant Examiner*—Anton Rabovianski
(74) *Attorney, Agent, or Firm*—Casimer K. Salys; Jack V. Musgrove

(57) ABSTRACT

A method of managing a distributed cache structure having separate cache banks, by detecting that a given cache line has been repeatedly accessed by two or more processors which share the cache, and replicating that cache line in at least two separate cache banks. The cache line is optimally replicated in a cache bank having the lowest latency with respect to the given accessing processor. A currently accessed line in a different cache bank can be exchanged with a cache line in the cache bank with the lowest latency, and another line in the cache bank with lowest latency is moved to the different cache bank prior to the currently accessed line being moved to the cache bank with the lowest latency. Further replication of the cache line can be disabled when two or more processors alternately write to the cache line.

15 Claims, 4 Drawing Sheets

DATA REPLICATION IN MULTIPROCESSOR NUCA SYSTEMS TO REDUCE HORIZONTAL CACHE THRASHING

This invention was made with U.S. Government support under NBCHC020056 awarded by PERCS phase 1. THE GOVERNMENT HAS CERTAIN RIGHTS IN THIS INVENTION.

BACKGROUND OF THE INVENTION

1. Field of the Invention

The present invention generally relates to computer systems, specifically computer cache memory, and more particularly to a method of managing a distributed cache structure of a multiprocessor computer system.

2. Description of the Related Art

The basic structure of a conventional computer system 10 is shown in FIG. 1. Computer system 10 may have one or more processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices and memory by various means, including a generalized interconnect or bus 20. Computer system 10 may have many additional components which are not shown, such as serial, parallel and universal bus ports for connection to, e.g., modems, printers or network interface cards. Those skilled in the art will further appreciate that there are other components that might be used in conjunction with those shown in the block diagram of FIG. 1; for example, a display adapter might be used to control a video display monitor, a memory controller can be used to access memory 16, etc. Also, instead of connecting I/O devices 14 directly to bus 20, they may be connected to one or more secondary (I/O) buses via I/O bridges connected to bus 20. The computer can have more than two processing units.

In a symmetric multiprocessor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from the more remote memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12 can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may have on-board caches with 64 kilobytes of total storage. Cache 30 is connected to bus 20, and all loading of information from memory 16 into processor core 22 usually comes through cache 30. Although FIG. 1 depicts only a two-level cache hierarchy, multi-level cache hierarchies can be provided where there are many levels of interconnected caches. Furthermore, cache 30 may also be an on-board cache. Caches are said to be horizontally oriented when they are on the same level of the memory hierarchy (e.g., caches 24 and 26), and are said to be vertically oriented when they are on different levels of the memory hierarchy (e.g., caches 24 and 30).

A cache has many blocks which individually store the various instructions and data values. The blocks in any cache are divided into groups of blocks called sets or congruence classes. A set is the collection of cache blocks that a given memory block can reside in. For any given memory block, there is a unique set in the cache that the block can be mapped into, according to preset (variable) mapping functions. The number of blocks in a set is referred to as the associativity of the cache, e.g. 2-way set associative means that for any given memory block there are two blocks in the cache that the memory block can be mapped into; however, several different blocks in main memory can be mapped to any given set. A 1-way set associate cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the actual instruction or data. The state bit field and inclusivity bit fields are used to maintain cache coherency in a multiprocessor computer system (to indicate the validity of the value stored in the cache). The address tag is usually a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

When all of the blocks in a congruence class for a given cache are full and that cache receives a request, whether a "read" or "write," to a memory location that maps into the full congruence class, the cache must evict one of the blocks currently in the class. The cache chooses a block by one of a number of means such as least recently used (LRU) algorithm, random, pseudo-LRU, etc. If the data in the chosen block is modified, that data is written to the next lowest level in the memory hierarchy which may be another cache (in the case of an L1 cache) or main memory (in the case of an L2 cache), as depicted in the two-level architecture of FIG. 1. By the principle of inclusion, the lower level of the hierarchy will already have a block available to hold the written modified data. However, if the data in the chosen block is not modified, the block can be simply abandoned and not written to the next lowest level in the hierarchy. At the end of this process, the cache no longer holds a copy of the evicted block. When a device such as the CPU or system bus needs to know if a particular cache line is located in a given cache, it can perform a "snoop" request to see if the address is in the directory for that cache. Various techniques have been devised to optimize cache usage, such as special cache instructions and coherency states.

As multiprocessor systems have grown in size and complexity, there has been an evolution in the memory hierarchy toward the computer system topology known as non-uniform memory access (NUMA), which addresses many of the limitations of SMP computer systems at the expense of some additional complexity. A typical NUMA computer system includes a number of interconnected nodes that each have one or more processors and a local "system" memory. Such computer systems are said to have a non-uniform memory access because each processor has lower access latency with respect to data stored in the system memory at its local node than with respect to data stored in the system memory at a remote node.

In addition to non-uniform main (system) memory, multiprocessor systems can also employ a non-uniform cache architecture (NUCA). NUCA systems are becoming more prevalent as improvements in silicon technology allow increasingly larger amounts of caches and multiple processors to be incorporated into a single integrated circuit (IC) chip. In a NUCA scheme, the overall cache structure is distributed among many smaller cache banks or ways scattered on the IC chip. A cache block mapping function can spread a cache set across multiple banks. This arrangement will result in two processors on the chip having different latencies to different ways of the same set, and the latency of accessing a cache line from a remote cache way can be significantly higher than the latency of accessing it from a way that is closer to the processor. Thus, an L1 or L2 cache access may have considerably different latencies depending on the location of the bank holding the way where the requested value resides.

At any given moment, if a memory block is stored in a NUCA cache, it can only be located in one of the cache ways in a set. Throughout program execution, the cached value (program instruction or operand data) may move closer to the processor that accesses it more often due to natural cache usage and eviction. There is, however, a problem in the design of such multiprocessor systems wherein multiple processors share a NUCA cache. The value may move back and forth between horizontal cache banks of the two (or more) processors. This situation can result in a thrashing effect when there is a high rate of usage of that memory block by both processors, leading to inefficiencies and bottlenecks in overall processing throughput. It would, therefore, be desirable to devise an improved method of managing a distributed cache structure which mitigates or removes unwanted horizontal thrashing while retaining the benefits of a NUCA cache.

SUMMARY OF THE INVENTION

It is therefore one object of the present invention to provide an improved cache memory for a multiprocessor computer system.

It is another object of the present invention to provide such a cache memory that has multiple horizontal caches or cache banks which are more efficiently accessed by multiple processors.

It is yet another object of the present invention to provide an improved method of handling cached values in a NUCA system in order to reduce overall cache latency.

The foregoing objects are achieved in a method of managing a distributed cache structure having separate cache banks, generally comprising accessing a line of a cache repeatedly from two or more processors which share the cache, detecting that the cache line has been repeatedly accessed by two or more processors, and then replicating the cache line in at least two separate cache banks of the cache. When separate cache banks have different access latencies with respect to a given one of the accessing processors, the cache line is optimally replicated in a cache bank having the lowest latency with respect to the given accessing processor. A currently accessed line in a different cache bank can be exchanged with a cache line in the cache bank with the lowest latency, and another line in the cache bank with lowest latency is moved to the different cache bank prior to the currently accessed line being moved to the cache bank with the lowest latency. Control logic in the cache counts the accesses of the cache line by each of the accessing processors, and can determining when access counts for at least two accessing processors have exceeded a preset threshold. The access count values for the entire cache can be reset at periodic intervals, or reset on a per-line basis when more than one of the access count values saturate. When a write operation is directed to the cache line, the value can be updated for the cache line in only one cache bank while invalidating other replications of the cache line or, alternatively, the value can be updated for the cache line in each cache bank having a replication of the cache line. Further replication of the cache line can be disabled when two or more processors alternately write to the cache line. A check for migration or replacement can be performed after a preset number of accesses to a line. The cache may further use an affinity set having weights to indicate how much latency is required to access data from a particular cache bank.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
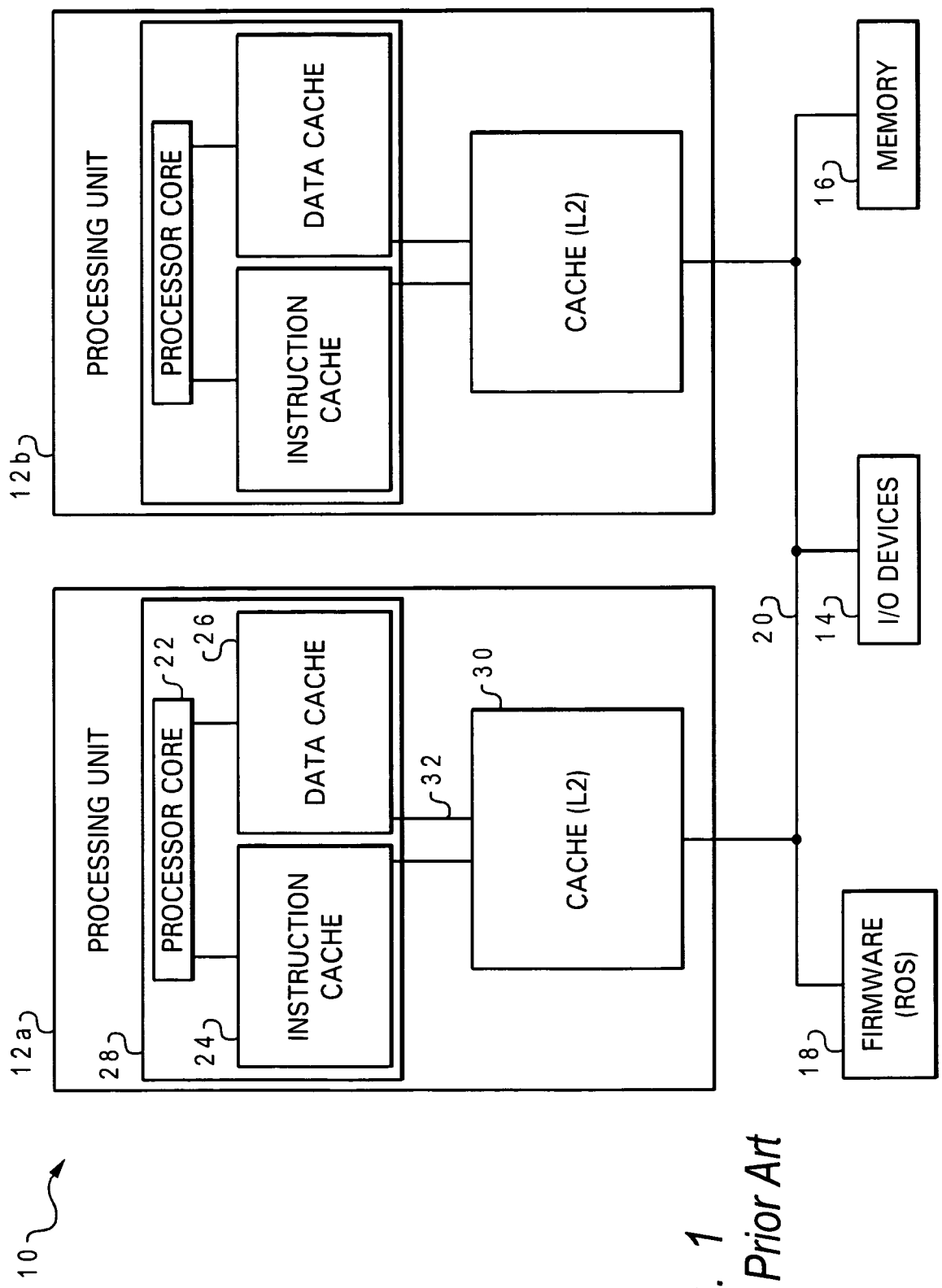
FIG. 1 is a block diagram of a conventional computer system, depicting a memory hierarchy which includes a main memory device and multiple memory caches.
Figure 2:
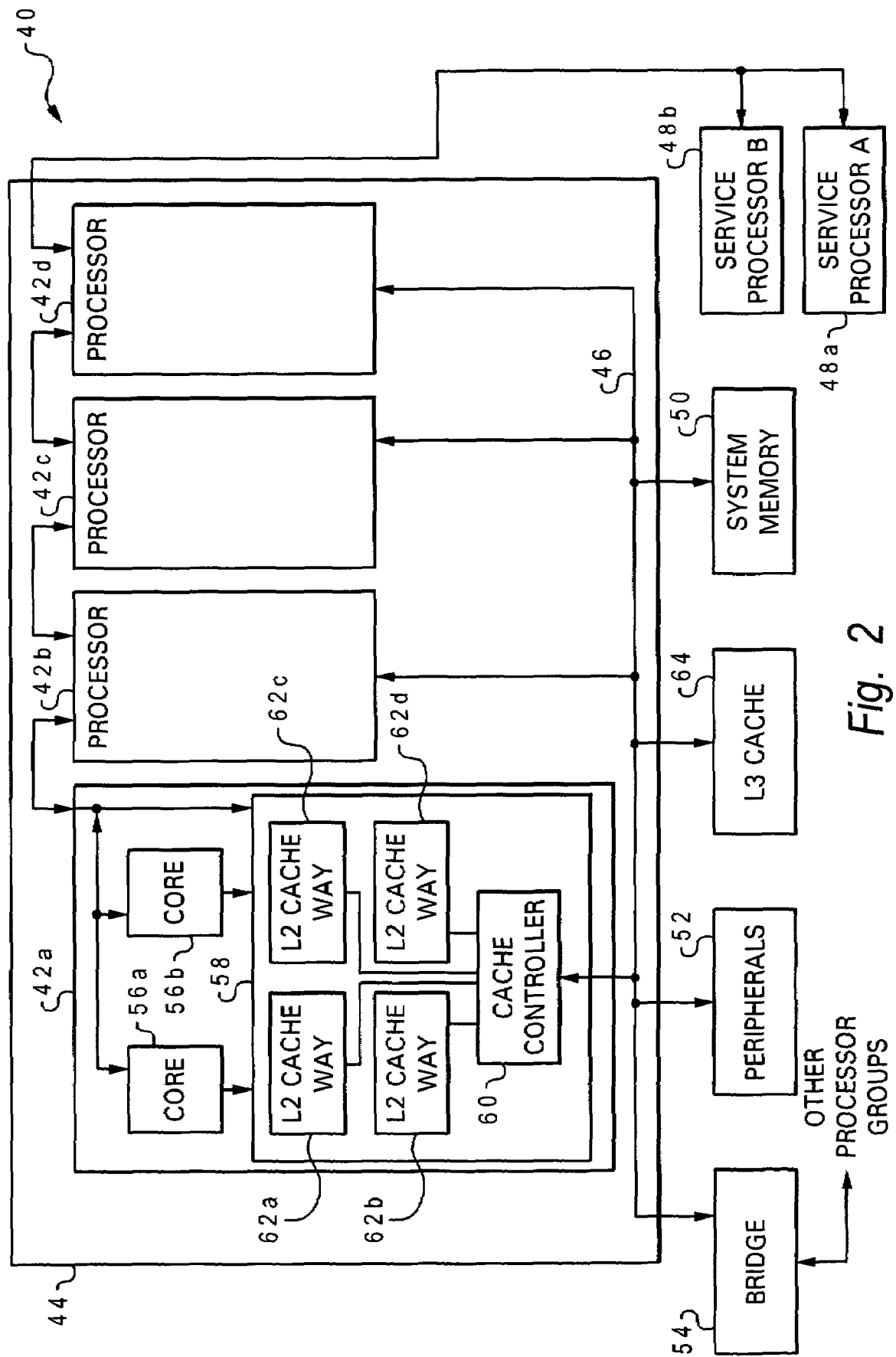
FIG. 2 is a block diagram of one embodiment of a computer system constructed in accordance with the present invention, which includes a memory hierarchy having a non-uniform cache architecture (NUCA)

With reference now to the figures, and in particular with reference to FIG. 2, there is depicted one embodiment 40 of a multiprocessor computer system constructed in accordance with the present invention. Computer system 40 has one or more processing units arranged in one or more processor groups or clusters; in the depicted system, there are four processing units 42a, 42b, 42c and 42d in processor group 44. The processing units communicate with other components of system 40 via a system or fabric bus 46. Fabric bus 46 is connected to a system memory 50, and various peripheral devices 52. Service processors 48a, 48b are connected to processing units 42 via a JTAG interface or other external service port. A processor bridge 54 can optionally be used to interconnect additional processor clusters. System 40 may also include firmware with one of the service processors which stores the system's basic input/output logic, and seeks out and loads an operating system from one of the peripherals whenever the computer system is first turned on (booted).

System memory 50 (random access memory or RAM) stores program instructions and operand data used by the processing units, in a volatile (temporary) state. In a more complex version of computer system 40 with multiple processing clusters 44 interconnected by bridges 54, the system memory can be distributed between the clusters with non-uniform memory access (NUMA). Peripherals 52 may be connected to fabric bus 46 via, e.g., a peripheral component interconnect (PCI) local bus using a PCI host bridge. A PCI bridge provides a low latency path through which processing units 42a, 42b, 42c and 42d may access PCI devices mapped anywhere within bus memory or I/O address spaces. A PCI host bridge also provides a high bandwidth path to allow the PCI devices to access RAM 50. Such PCI devices may include, e.g., a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device.

Computer system 40 is preferably operated as a symmetric multiprocessor (SMP) computer, so each of the processing units 42a, 42b, 42c and 42d are generally identical and use the same set of instructions and protocols to operate.

As shown with processing unit 42a, each processing unit may include one or more processor cores 56a, 56b which carry out program instructions in order to operate the computer. An exemplary processor core includes the PowerPC™ processor which comprises a single integrated circuit superscalar microprocessor having various execution units, registers, buffers, memories, and other functional units. The processor cores may operate according to reduced instruction set computing (RISC) techniques, and may employ both pipelining and out-of-order execution of instructions to further improve the performance of the superscalar architecture.

Each processor core 56a, 56b includes its own on-board or L1 cache (separated into an instruction cache and a data cache). Each processing unit 42 is further provided with another (L2) cache 58 constructed with a non-uniform cache architecture (NUCA). L2 cache 58 has a cache controller 60 and several cache ways 62a, 62b, 62c and 62d which support both of the L1 caches that are respectively part of cores 56a and 56b. The individual ways are selected by a way-selection algorithm residing in cache controller 60. Additional cache levels may be provided, such as an L3 cache 64 which is accessible via fabric bus 46. The caches are coherent and can utilize a coherency protocol such as MESI (modified-exclusive-shared-invalid) or some variant thereof. Each cache level, from highest (L1) to lowest (L3) can successively store more information, but at a longer access penalty. For example, the on-board L1 caches in the processor cores might have a storage capacity of 64 kilobytes of memory, L2 cache 58 might have a storage capacity of 512 kilobytes common to both cores (i.e., each L2 cache way 62 has 128 kilobytes of memory), and L3 cache 64 might have a storage capacity of 4 megabytes.

L2 cache ways 62a, 62b, 62c and 62d generally handle all cacheable load/store instructions, data and instruction prefetches, zero-out instructions (e.g., DCBZ), and synchronization instructions. In the exemplary embodiment, the cache line size is 128 bytes, and is fully inclusive of the L1 data cache. L2 cache 58 can include other devices such as non-cacheable units (NCUs) to handle other communication with the processor cores, such as cache-inhibited load/store instructions and cache operations.

Any of the components of computer system 40 can include error correction code (ECC) circuitry to correct errors that might arise from, e.g., stray radiation, electrostatic discharge or a defective cell. In particular the caches of computer system 40 can utilize single-bit correct/double-bit detect (SBC/DBD) error correction.

In order to avoid the latencies associated with accessing values that are located in a cache way that is remote from a requesting processor core, the present invention allows the NUCA cache to replicate a frequently used value within a set (in different banks) so that two or more processors requiring access to the value can each have the memory block located close to them. The invention may be implemented using an algorithm that detects accesses by the different processors and then replicates the block in a closer NUCA array if two or more processors are repeatedly accessing that block. In this manner, each processor can access the block with reduced latency and without horizontal cache thrashing.

Figure 3:
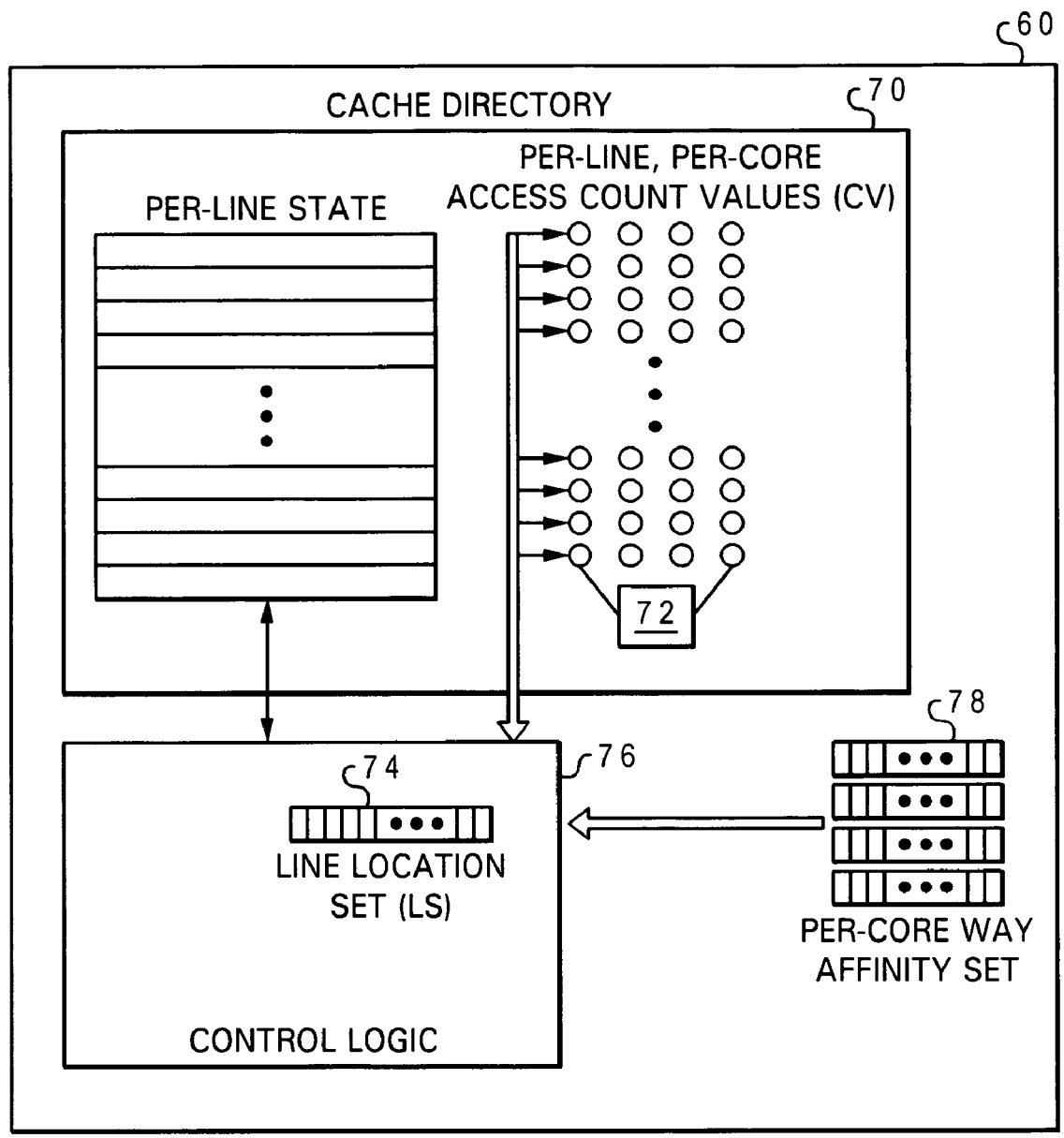
FIG. 3 is a block diagram of one embodiment of the cache controller used with the NUCA cache of FIG. 2 and constructed in accordance with the present invention, illustrating the cache directory, cache line counters, and registers for storing replicated cache line locations.

Referring now to FIG. 3, cache controller 60 includes a per-core way affinity set 78, a cache directory 70, and control logic 76. The per-core way affinity set 78 is a static structure that indicates which ways of the cache are physically proximate to a particular core in the system. Cache directory 70 contains per-line state information such as inclusivity bits and coherency bits. Directory 70 also contains an array of per-line, per-core access count values 72. In addition to the logic necessary to carry out cache accesses and snoops, control logic 76 contains a location set 74 that indicates which ways of a set contain the values for a particular line being processed by control logic 76. There are as many bits in line location set 74 as there are ways in a cache set. If the values for a line being processed are in ways 0 and 3, bits 0 and 3 of line location set 74 will be set, and other bits will be reset.

Read and write operations to cache directory 70 are controlled by control logic 76. Redundant directory arrays can be provided with two independent read ports for core and snoop traffic.

Cache line access count values 72 keep track of the number of accesses each processor or core has made to a given cache line. If there are N processors in the local NUCA system, then N access count values are provided for each cache line in the system. In an exemplary embodiment, the maximum per-core value stored in this structure may be 1,023. Control logic 76 contains logic to retrieve the CV 72, operate upon them, and store them back.

Control logic 76 can include various features of conventional cache controllers such as a least-recently used (LRU) algorithm for cache line eviction, and coherency logic to update the state of a particular cache line. Control logic 76 can check a given cache line's counter access count values 72, compare them against each other and against pre-established thresholds, increment them, or reset them. Control logic 76 can also reset the CV for all cores and all lines in the cache.

Figure 4:
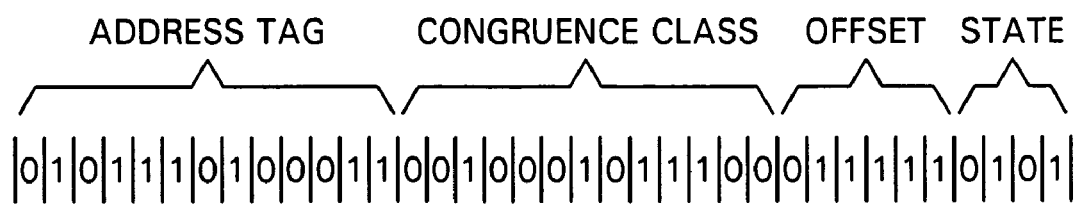
FIG. 4 is a pictorial representation of one format for a line in the cache directory of the NUCA cache of FIG. 2 according to one implementation of the present invention.

With further reference to FIG. 4, there is depicted an exemplary line from cache directory 70. A portion of the full address of the corresponding memory block may be used to refine the congruence class mapping. For example, a 32-bit full address might be broken down into three parts, an offset field, a congruence class field, and an address tag field. The offset field, six-bits in this example, defines the exact location of the byte within the value field corresponding to the actual instruction or data. The congruence class field is used as the input operand to the mapping function and assigns the memory block to a set. In this example, the congruence class field is 13 bits and the address tag is 13 bits for 8-way associativity. The directory line also shows four state bits for cache coherency and inclusivity. An alternative implementation may include more state bits to better track cache coherence and inclusion.

Figure 5:
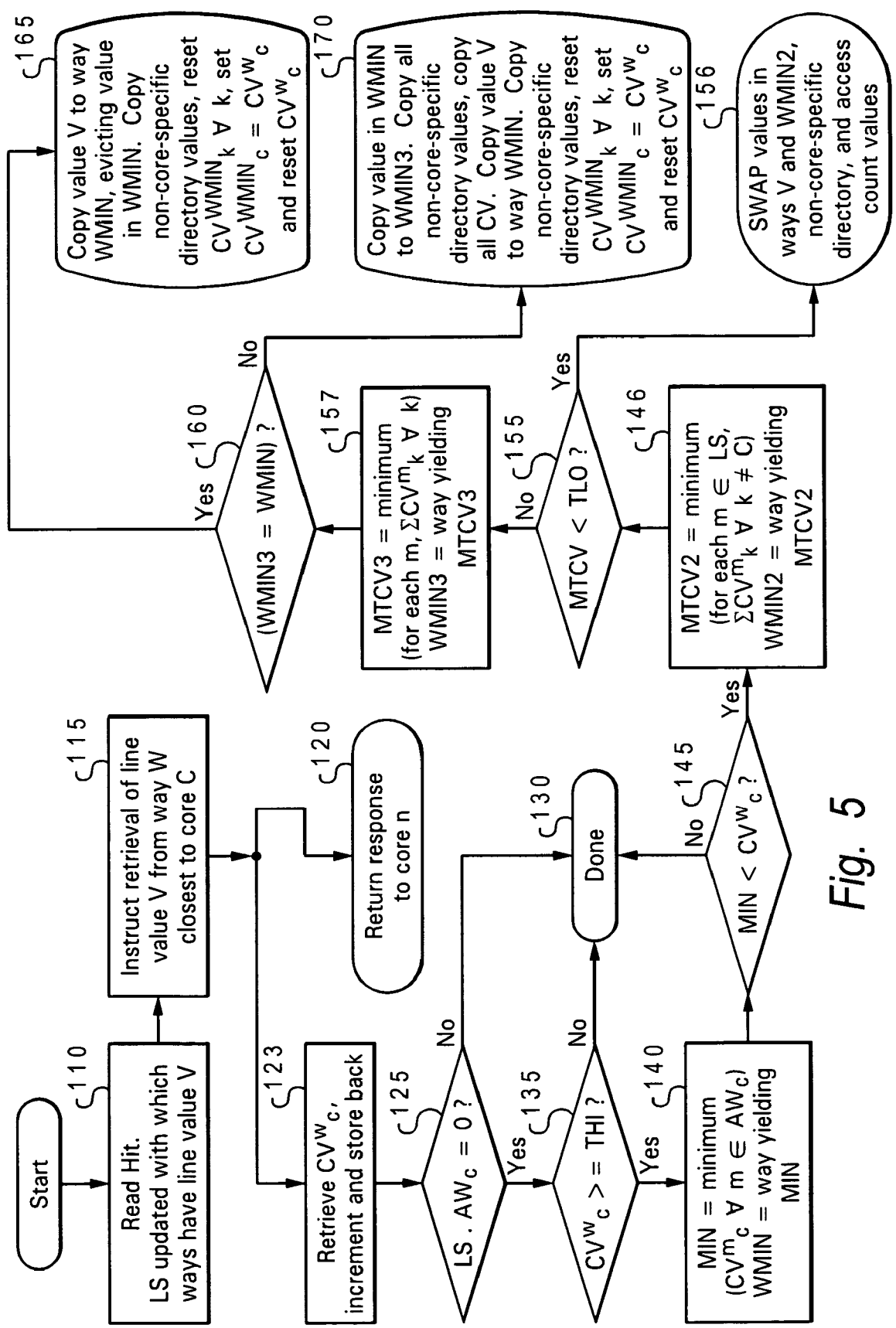
FIG. 5 is a chart illustrating the logical flow for data replication in a NUCA system according to one implementation of the present invention.

The present invention may be further understood with reference to the flow chart of FIG. 5, in which "$AW_C$" is the set of ways that are physically proximate to a core C, "$CV^W_C$" is the access count value by core C for way W (indicating the number of times that core C has accessed the line in way W), and "LS" is the line location set for the line being processed (indicating which ways of the cache contain the values for the line being processed).

The flowchart begins when a read hit for a line L from core C has been determined. In block 110, control logic 76 updates LS with which ways of the set have the line value V. In block 115, control logic 76 uses the affinity way set $AW_C$ to determine which way in LS is closest to core C and instructs that way to supply the line value to the core C. In block 120, the chosen NUCA way responds to the core C.

Concurrently with the retrieval of the line value and its return to core C, control logic 76 determines whether the line value V should be replicated. Consequently, the cache operations presented in this document are not on the critical path of a cache read. The control logic first retrieves, increments and stores back the access count value of the way W for core C (block 123). This increment operation is done without rollover—i.e., the access count value saturates upon reaching the limit that can be accommodated in the access count value. Below, we refer to this as the current line's CV. In block 125, the control logic determines whether the value is already in a way close to core C by examining whether LS and $AW_C$ have a common way. If there is a way in common, the controller is done and stops at block 130. If there is no common way, the controller retrieves the current access count value for the way W from which the line value was supplied to core C, and compares it against a pre-established threshold THI.

If the access count value does not exceed the THI threshold, the controller stops at block 130. Replication of this line will be considered only when the line is accessed more times, indicated by the access count value exceeding THI. If the access count value exceeds THI, in block 140, the control logic determines the minimum access count value for all ways in the way affinity set of core C. Let MIN be the minimum access count value and WMIN the way for which the minimum is obtained. The minimum access count value is compared against the current line's CV in block 145. If the minimum is higher than the current line's CV, the line values already in ways close to core C have been accessed more times than the current line. The controller stops the replication attempt by moving to block 130.

If the minimum access count value MIN is lower than the current line's CV, it may be profitable to move the current line's value closer to core C. There are two possibilities. First, the current line's value and the value in MIN could be swapped. Alternately, the current line's value may be copied over into WMIN and a copy left where it is now (because another core is accessing the current line with high frequency), requiring some value in the cache to be evicted.

In step 146, the control logic determines what option to take by first examining, for each way where the current line resides, the sum of the access count values for cores other than C. Let WMIN2 be the way that yields the minimum summed access count value. If the summed access count is less than a pre-established threshold TLO (block 155), then the current line value in way W and the value in way MIN are swapped in block 156. The non-core-specific directory values are swapped as well. The access count values corresponding to ways W and MIN are swapped.

If the minimum summed access count value is greater than the pre-established threshold TLO, then the current line must be copied over into WMIN. The value currently in WMIN must either be evicted, or moved to a way whose existing value will be evicted. Which option to pick is determined in steps 157, 158, 160, 165, and 170.

Block 157 computes the minimum of the summed access count values over all cores, for each way in the set. Let WMIN3 be the way with the minimum summed access count value MTCV3. In block 160, the way WMIN3 is compared against WMIN. If these are the same, then the value in WMIN is evicted from the cache in block 165. The non-core-specific directory values are copied over from W's directory entry to WMIN's directory entry. All access count values for WMIN are reset, the access count value for core C is copied over from W, and $CV^W_C$ is reset.

If the two ways are different in the comparison in block 160, the value in way WMIN3 is evicted from the cache by copying the value in WMIN to WMIN3. The directory entries are adjusted to reflect this eviction/copying by copying all non-core-specific values over, and copying all the access count values over. The value in WMIN is now copied to WMIN3. The non-core-specific directory values are copied over. All the access count values for WMIN3 are reset, the access count value for core C is copied over from W, and $CV^W_C$ is reset.

When a write operation occurs, there are two alternatives for handling the replicas. In one embodiment, the new line contents can simply be sent to all replicas to update them. In another embodiment, all replicas are invalidated except for the replica closest to the writing processor, which carries out the write operation and updates its cache line. In the latter embodiment, replication can be disabled if two processors alternately write to the same line.

When a snoop request for a line is received and the line needs to be invalidated, all the ways of the line are invalidated. A write by a core may require all but one replica of the line to be invalidated. When a line in a way is invalidated, the access count values for all cores of the line in that way are set to zero.

It will be apparent to those skilled in the art that the steps between 123 and 170 in the flowchart need not all be computed sequentially. Where precedence constraints and dependencies permit, steps can be computed in parallel. For instance, the computation in steps 140, 142, and 157 do not depend on each other and can be computed in parallel. This parallel operation will permit the steps in the flowchart to be executed faster.

It will also be apparent to those skilled in the art that the check for replication in the flowchart in FIG. 5 need not be carried out at every access. Rather, it can be carried out only on every nth access, where n can be a configurable parameter.

The access count values are periodically reset to zero in order to capture temporal access patterns. It will be apparent to those skilled in the art that the access count values can also be zero'd out on a per-line basis when multiple access count values saturate.

It will also be apparent to those skilled in the art that the affinity way set can be set to have weights associated with each way so as to better reflect the continuum of latencies that may exist when a core accesses different cache banks.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the foregoing description discusses a NUCA cache that is distributed in different cache ways across a single IC chip, but the invention is applicable more generally to any horizontal cache thrashing and could be applied to a larger scale, e.g., a cache that is distributed across chips in a processor cluster, or even across the entire multiprocessor system topology. It is therefore contemplated that such modifications can be made without departing from the spirit or scope of the present invention as defined in the appended claims.

What is claimed is:

1. A method of managing a cache structure of a multiprocessor computer system having a plurality of cache lines distributed among multiple cache ways wherein affinity sets of the cache ways are associated with respective processors, comprising:
   detecting a read operation from a requesting processor for a given cache line;
   updating a line location set corresponding to the given cache line to indicate which of the cache ways contain the given cache line;
   instructing retrieval of the given cache line from a first cache way that is closest to the requesting processor and contains the given cache line;
   transmitting the given cache line to the requesting processor from the first cache way;
   concurrently with said transmitting, incrementing an access counter associated with the requesting processor for the given cache line to yield an incremented access count value;
   determining that the first cache way is in a first affinity set remote from the requesting processor;
   comparing the incremented access count value to a pre-established threshold to establish that the incremented access count value exceeds the pre-established threshold;
   determining a minimum access count value for all cache ways in a second affinity set proximate to the requesting processor;
   comparing the incremented access count value to the minimum access count value to establish that the incremented access count value exceeds the minimum access count value; and
   replicating the given cache line in a second cache way of the second affinity set wherein the second cache way contains a different cache line corresponding to the minimum access count value.

2. The method of claim 1 further comprising evicting the different cache line from the second cache way.

3. The method of claim 1 further comprising moving the different cache line from the second cache way to a third cache way in a third affinity set.

4. The method of claim 1 wherein the access counter is incremented without rollover.

5. The method of claim 1 wherein the access counter is periodically reset to zero.

6. A cache memory unit for a multiprocessor computer system, comprising:
   a first plurality of cache ways arranged in a first affinity set proximate a processor;
   a second plurality of cache ways arranged in a second affinity set remote from the processor;
   a first cache directory having state information for a first plurality of cache lines in said first cache ways and having a first plurality of access counters;
   a second cache directory having state information for a second plurality of cache lines in said second cache ways and having a second plurality of access counters; and
   control logic which
      detects a read operation for a requested one of the second cache lines,
      updates a line location set to indicate which of said first and second cache ways contain the requested cache line,
      instructs retrieval of the requested cache line from said second cache ways,
      concurrently with said retrieval increments one of said first access counters associated with the requested cache line to yield an incremented access count value,
      compares the incremented access count value to a pre-established threshold to establish that the incremented access count value exceeds the pre-established threshold,
      compares the incremented access count value to a minimum access count value of said first access counters for the first plurality of cache ways to establish that the incremented access count value exceeds the minimum access count value, and
      copies the requested cache line to one of said first plurality of cache ways having the minimum access count value.

7. The cache memory unit of claim 6 wherein said control logic further evicts a different cache line corresponding to the minimum access count value from the first plurality of cache ways.

8. The cache memory unit of claim 6 wherein said control logic further moves a different cache line corresponding to the minimum access count value from the first plurality of cache ways to a third plurality of cache ways arranged in a third affinity set remote from the processor.

9. The cache memory unit of claim 6 wherein said one of said first access counters is incremented without rollover.

10. The cache memory unit of claim 6 wherein said first and second access counters are periodically reset to zero.

11. A computer system comprising:

at least first and second processing cores;

a main memory; and a distributed cache memory interconnected with said processing cores and said main memory, said distributed cache memory including a first plurality of cache ways arranged in a first affinity set proximate said first processing core, a second plurality of cache ways arranged in a second affinity set proximate said second processing core, a first cache directory having state information for a first plurality of cache lines in said first cache ways and having a first plurality of access counters, a second cache directory having state information for a second plurality of cache lines in said second cache ways and having a second plurality of access counters, and control logic which detects a read operation from the first processing core for a requested one of the second cache lines, updates a line location set to indicate which of said first and second cache ways contain the requested cache line, instructs retrieval of the requested cache line from said second cache ways, concurrently with said retrieval increments one of said first access counters associated with the requested cache line to yield an incremented access count value, compares the incremented access count value to a pre-established threshold to establish that the incremented access count value exceeds the pre-established threshold, compares the incremented access count value to a minimum access count value of said first access counters for the first plurality of cache ways to establish that the incremented access count value exceeds the minimum access count value, and copies the requested cache line to one of said first plurality of cache ways having the minimum access count value.

12. The computer system of claim 11 wherein said control logic further evicts a different cache line corresponding to the minimum access count value from the first plurality of cache ways.

13. The computer system of claim 11 wherein said control logic further moves a different cache line corresponding to the minimum access count value from the first plurality of cache ways to a third plurality of cache ways arranged in a third affinity set proximate a third processing core.

14. The computer system of claim 11 wherein said one of said first access counters is incremented without rollover.

15. The computer system of claim 11 wherein said first and second access counters are periodically reset to zero.

* * * * *